United States Patent [19]
Sothcott et al.

[11] 3,873,983
[45] Mar. 25, 1975

[54] RADIO NAVIGATION BEACON

[75] Inventors: Peter Sothcott, London; Stanley B. Marsh, Bishop's Stortford, both of England

[73] Assignee: International Standard Electric Corporation, New York, N.Y.

[22] Filed: Aug. 14, 1972

[21] Appl. No.: 280,152

[30] Foreign Application Priority Data
Aug. 20, 1971 United Kingdom............... 39158/71

[52] U.S. Cl........................... 343/106 D, 343/108 M
[51] Int. Cl. ............................ G01s 1/44, G01s 1/16
[58] Field of Search ............ 343/5 LS, 16 R, 106 D, 343/108 M, 113 DE

[56] References Cited
UNITED STATES PATENTS
3,234,554 2/1966 Earp et al. ..................... 343/106 D
3,277,481 10/1966 Robin et al........................ 340/3 PS
3,626,419 12/1971 Earp ............................... 343/106 D
3,670,337 6/1972 Earp............................... 343/108 M Primary Examiner—Maynard R. Wilbur
Assistant Examiner—T. M. Blum
Attorney, Agent, or Firm—William T. O'Neil

[57] ABSTRACT

A Doppler Navigation system which includes a surface based commutated array on a platform to provide air derived angle information, particularly for aircraft landing approach guidance. The program of array commutation is frequency off-set with respect to a reference antenna and this offset is used in the air derivation of angle data. A gyro or other source of platform pitch or yaw provides a signal which is used to shift the so-called offset to compensate measurement errors due to platform motion.

5 Claims, 1 Drawing Figure

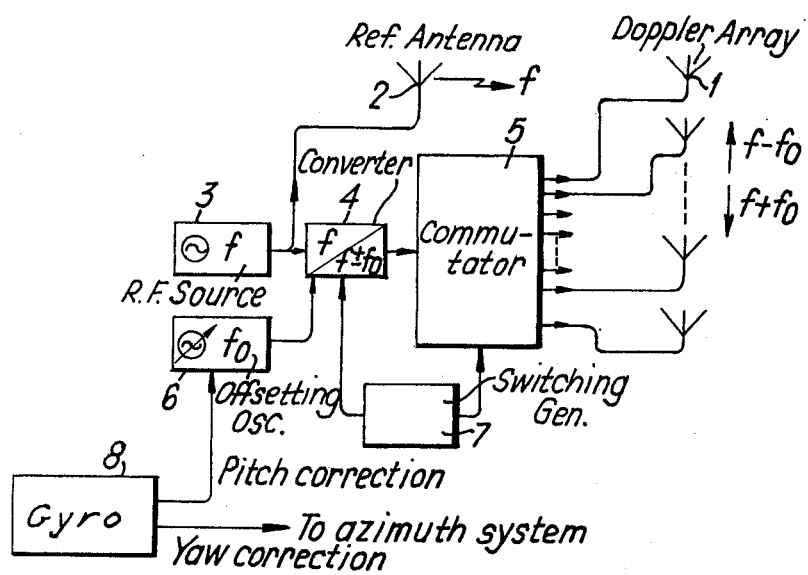

3,873,983

RADIO NAVIGATION BEACON

CROSS REFERENCE TO RELATED APPLICATIONS

This application is filed under the provisions of 35 U.S.C.119 with claim for the benefit of the filing of an application covering the same invention filed Aug. 20, 1971, Ser. No. 39158/71, in Great Britain.

BACKGROUND OF THE INVENTION

1. Field of the Invention

This invention relates to electronic navigation using surface beacons of the Doppler type. More particularly, the invention relates to Doppler systems in which angle data, particularly for aircraft landing approach, is air derived from ground beacon signals from a commutated array producing a simulated Doppler frequency which is a function of approach angle.

2. Description of the Prior Art

Prior art systems disclosing the type of equipment to which the present invention applies are described in British Pats. No. 1,225,190, and 1,234,541. Certain elements of those systems are also described in U.S. Pat. No. 3,728,729 (corresponding to an application assigned to the assignee of the present application,) (Ser. No. 210,699 filed Dec. 22, 1971).

The above-mentioned patent specifications describe pertinent aspects of Doppler radio navigation beacons which operate by commutation of RF energy successively through the elements of an array of radiators to simulate constant velocity motion of a single radiator. A reference antenna (fixed with respect to the commutated Doppler array) radiates a reference signal off-set in frequency with respect to the commutated radiation. This provides a signal in space from which the remote station (approaching aircraft receiver, for example) can extract a beat frequency signal which varies with the cosine of the angular approach path (angle of reception) displacement with respect to the line of the commutated array.

A vertically oriented commutated linear array is adapted, according to the foregoing theoretical considerations, for providing elevation angle data, and a horizontally disposed array provides azimuth or bearing information. Each such array permits surrounding space to be coded in terms of conical or part-conical surfaces of various angles, all the conical surfaces being defined by a given array having an axis common with the axis of the array.

When the commutated array and reference antenna are mounted on a variable platform, such as provided by a vessel at sea, erroneous guidance information is produced since the fixed angle versus received Doppler component is lost.

The manner in which the present invention compensates for this situation will be understood as this description proceeds.

SUMMARY OF THE INVENTION

It may be said to be the general object of the present invention to automatically compensate such errors as hereinabove described in signals from the above outlined Doppler arrays when the array or arrays are subjected to movement as will arise when unstabilized platform mounting, e.g., on board a ship, is employed.

According to the invention there is provided a radio navigation approach beacon including an antenna array arranged to simulate constant velocity linear motion of a radiating source of radio frequency energy, a reference antenna arranged to radiate radio frequency energy off-set in frequency from that radiated by the array, and means for varying the frequency off-set in such a manner as to compensate for angular movement of the array in the approach plane of the beacon.

The three basic angular (extraneous) motions of a ship are roll, pitch and yaw, and their approximate maximum extents may be summarized as follows:

Yaw: ± ½°, period up to 15 sec. plus possible addition due to steering errors of ± 1½°, period up to 3 mins.
Pitch: ± 2½°, period up to 10 secs.
Roll: ± 5°, period up to 15 secs.

For a vertical Doppler array (mounted near the center of the ship), there will be no error introduced by yaw as the conical guidance surfaces merely rotate about their common axis and are otherwise unchanged. However, pitch of angle $\phi$ will introduce an error of $\phi$ directly into the elevation signals received by an aircraft approaching at azimuth angle $\theta = 0$, i.e., along the fore-aft axis of the ship. The magnitude of the error will reduce slowly with increasing $\theta$ and, in off-axis approaches, will also change slowly with elevation. The third motion, roll, will introduce no error into the elevation signals received by an aircraft approaching at $\theta = 0$ and at low elevation, but as the elevation angle is raised, or the azimuthal angle increased, a small error would be introduced.

Ships' motions also introduce certain errors into the signals received from a horizontal array. In that case, pitch introduces no error, yaw introduces a direct error, and roll introduces no error at $\theta = 0$ but error grows with $\theta$ and with elevation.

The manner in which the present invention deals with these errors will be understood as this description proceeds.

BRIEF DESCRIPTION OF THE DRAWING:

A single FIGURE block diagram illustrates the configuration of the system of the invention.

DESCRIPTION OF THE PREFERRED EMBODIMENT(S)

Referring now to the single FIGURE, the manner of correction applied to an unstabilized ship-mounted elevational guidance Doppler beacon will be described. A vertical stack (array) of antenna elements 1 with bidirectional scanning (as is more fully described in the afore-mentioned British Pat. No. 1,234,541) is provided. The sign of the frequency difference between that of the array and that of the reference antenna 2 is changed at each half period of commutation of the array.

A source 3 of radio frequency $f$ feeds the reference antenna 2, and via frequency converter or translator 4 also feeds a commutator 5 for appropriately feeding the elements of the array 1 with a frequency of $f \pm f_o$ (according to direction of scan of the array). The frequency $f_o$ is a variable frequency derived from an off-setting oscillator 6. There is a switching generator 7 coupled between the commutator 5 and the converter (translator) 4. This element provides a scan program, since, in the prior art, the commutation has been alternated, interlaced and otherwise varied for reasons not affecting this invention. Element 7 is thus capable of directing addition or subtraction of $f_o$ as required in the commutation program.

The effects on this beacon of the ship's worst motions, i.e., pitch for this elevational guidance beacon (and yaw for an azimuthal guidance beacon, with a horizontal array) are compensated by changing the frequency of offset, i.e., the difference between the frequencies of the reference and commutated signals, in synchronism with the appropriate component of motion.

Thus, an aircraft approaching along the fore-aft axis of the ship and following the elevation guidance signals will detect the offset frequency, which will appear as the beat between reference and commutated signal, unchanged by any Doppler shift, at a typical frequency of 60kHz, for example. However, if the ship pitches by 1°, the aircraft would (without compensation) observe a change of frequency appropriate to a bona fide 1 degree elevation glide path change. The corresponding change of frequency would be on the order of 200 Hz, typically. To compensate for this error, the offset frequency is changed by a corresponding amount, i.e., to 59.8 kHz, by varying the output $f_o$ from the offsetting oscillator 6 under control of a signal from the ship's gyro system 8 indicating a pitch angle of 1°. The beat frequency measured by the aircraft is then 60 kHz, so that it continues on its horizontal approach path unperturbed by the short-term pitching motion of the ship. The effect of yaw on an azimuth system is similarly removed, by appropriately altering the offset frequency to counteract the effect of yaw.

This compensation holds over restricted sectors up to about ± 20°. Even with halving of those limits to ± 10° for azimuth and to 1°–10° for elevation, an entirely adequate angular range for all practical purposes is achieved.

The details of the elements 4, 5, 6, 7 and 8 will be readily understood by those skilled in the art from the general prior art and that hereinabove discussed, and from knowledge of the electronic arts in view of the described functions. The latter is particularly true in respect to the frequency addition and subtraction in element 4 and the controllable oscillator 6.

What is claimed is:

1. In a radio navigation approach beacon system mounted on an astable platform for radiating energy from an array commutated to simulate constant velocity linear motion of a radiating source of radio frequency energy whereby an apparent Doppler modulated signal is received by a remote station, the combination comprising:

first means for radiating a radio frequency reference signal; second means providing a radio frequency excitation signal to said commutated array at a frequency offset from the frequency of said reference signal, thereby to radiate which said remote station can extract a beat frequency signal which varies with the cosine of the angular approach path to provide approach angle data;

third means for sensing variations in the orientation of said astable platform to generate an error signal representative of said variations;

and fourth means connected to said third means for controlling the frequency offset of said array excitation signal to compensate for angular movement of said platform in the approach plane corresponding to the plane containing said approach angle data.

2. Apparatus according to claim 1 in which said angular movement is pitch, as understood in connection with ships, said commutated array is generally vertically oriented, said orientation variations sensed by said third means are pitch movements, and said approach plane of said beacon is the elevation plane.

3. Apparatus according to claim 1 in which said angular movement is yaw, as understood in connection with ships, said commutated array is generally horizontally oriented, said orientation variations sensed by said third means are yaw movements including steering errors, and said approach plane is the bearing plane.

4. In a radio navigation approach beacon system mounted on an astable platform for radiating energy from an array commutated to simulate constant velocity linear motion of a radiating source of radio frequency energy whereby an apparent Doppler modulated signal is received by a remote station, the combination comprising:

first means for radiating a radio frequency reference signal;

second means providing a radio frequency excitation signal to said commutated array at a frequency offset from the frequency of said reference signal, thereby to radiate which said remote station can extract a beat frequency signal which varies with the cosine of the angular approach path to provide approach angle data;

third means for sensing variations in the orientation of said astable platform and for generating a bipolar error signal corresponding to pitch angles on respective sides of a reference plane;

and fourth means connected to said third means for controlling said frequency offset of said array excitation signal to compensate for angular movement of said platform in the approach plane of said beacon, said fourth means being operative to increase said frequency offset corresponding to said third means signals representative of pitch angles in one sense with respect to said reference plane and to decrease said frequency offset corresponding to said third means signals representative of pitch angles in the other sense with respect to said reference plane.

5. Apparatus according to claim 4 in which said reference plane is defined as the horizontal plane.

* * * * *

UNITED STATES PATENT OFFICE
CERTIFICATE OF CORRECTION

PATENT NO. : 3,873,983
DATED : March 25, 1975
INVENTOR(S) : Peter Sothcott - Stanley B. Marsh It is certified that error appears in the above-identified patent and that said Letters Patent are hereby corrected as shown below:

Claim 1, line 56, between "radiate" and "which" insert ---signals from---.

Claim 4, line 36, between "radiate" and "which" insert ---signals from---.

Signed and Sealed this

Ninth Day of November 1976

[SEAL]

Attest:

RUTH C. MASON
*Attesting Officer*

C. MARSHALL DANN
*Commissioner of Patents and Trademarks*